US007613457B2

(12) United States Patent
Gao et al.

(10) Patent No.: US 7,613,457 B2
(45) Date of Patent: *Nov. 3, 2009

(54) SYSTEM AND METHOD FOR SUPPORTING QUALITY OF SERVICE IN VERTICAL HANDOVERS BETWEEN HETEROGENEOUS NETWORKS

(75) Inventors: Xia Gao, Campbell, CA (US); Gang Wu, Cupertino, CA (US)

(73) Assignee: NTT DoCoMo, Inc., Tokyo (JP)

( * ) Notice: Subject to any disclaimer, the term of this patent is extended or adjusted under 35 U.S.C. 154(b) by 417 days.

This patent is subject to a terminal disclaimer.

(21) Appl. No.: 11/418,858

(22) Filed: May 5, 2006

(65) Prior Publication Data

US 2006/0199588 A1 Sep. 7, 2006

Related U.S. Application Data

(63) Continuation of application No. 10/266,776, filed on Oct. 8, 2002, now Pat. No. 7,096,022.

(51) Int. Cl.
*H04W 36/00* (2006.01)
(52) U.S. Cl. ............... 455/444; 455/436; 455/442; 455/443; 455/438; 370/235.1; 370/332
(58) Field of Classification Search .......... 455/436, 455/443; 370/328, 331
See application file for complete search history.

(56) References Cited

U.S. PATENT DOCUMENTS 6,385,451 B1 *  5/2002  Kalliokulju et al. ......... 455/437

| 7,233,781 | B2 * | 6/2007 | Hunter et al. ............ 455/404.1 |
| 7,321,587 | B2 * | 1/2008 | Gao et al. ................ 370/388 |
| 7,363,037 | B2 * | 4/2008 | Huang et al. ............. 455/436 |
| 2002/0126633 | A1 * | 9/2002 | Mizutani et al. ........... 370/329 |
| 2003/0053453 | A1 * | 3/2003 | Ono et al. ................ 370/389 |
| 2003/0095523 | A1 * | 5/2003 | Korus et al. .............. 370/338 |
| 2003/0161284 | A1 * | 8/2003 | Chen ..................... 370/331 |
| 2003/0163558 | A1 * | 8/2003 | Cao et al. ................ 709/223 |
| 2003/0193910 | A1 * | 10/2003 | Shoaib et al. ............. 370/331 |
| 2004/0008689 | A1 * | 1/2004 | Westphal et al. ....... 370/395.21 |
| 2004/0165594 | A1 * | 8/2004 | Faccin et al. ........... 370/395.2 |
| 2004/0228304 | A1 * | 11/2004 | Riedel et al. ............. 370/332 |
| 2006/0083238 | A1 * | 4/2006 | Lee et al. ................ 370/389 |

OTHER PUBLICATIONS

Chiussi, Fabio M., Khotimsky, Denis A., Krishnan, Santosh: "A Network Architecture for MPLS-Based Micro-Mobility." IEEE 2002: 549-555.

* cited by examiner

*Primary Examiner*—Nay A Maung
*Assistant Examiner*—Richard Chan
(74) *Attorney, Agent, or Firm*—Blakely, Sokoloff, Taylor & Zafman LLP (57) ABSTRACT

A method, system, and business model are disclosed for supporting handover between a mobile host and a corresponding node located in a heterogeneous network. Handover paths are established to accommodate a plurality of quality of service properties. Admission control is performed that considers the established handover paths and an established first reservation path. Gateways are contacted to determine a handover path to use. The determined handover path is used to support vertical handover. A second reservation path is established while maintaining the first reservation path and the handover path.

5 Claims, 5 Drawing Sheets

SYSTEM AND METHOD FOR SUPPORTING QUALITY OF SERVICE IN VERTICAL HANDOVERS BETWEEN HETEROGENEOUS NETWORKS

This is a continuation of application Ser. No. 10/266,776, filed on Oct. 8, 2002 now U.S. Pat. No. 7,096,022, entitled "System and Method for Supporting Quality of Service in Vertical Handovers Between Heterogeneous Networks," and assigned to the corporate assignee of the present invention and incorporated herein by reference.

FIELD OF THE INVENTION

The present invention relates generally to telecommunication systems and more particularly to supporting quality of service with vertical handoffs in wireless mobile telecommunication systems.

BACKGROUND

Recent years have witnessed an explosive growth of mobile computing and the emergence of new wireless technologies. The desire to be connected any time, any where and in any way, leads to an increasing array of heterogeneous systems, application, devices and operators. Such heterogeneity is not likely to disappear in the foreseeable future because the variety of application requirements makes it difficult to find an optimal and universal solution. Likewise, an eagerness to capture the market encourages competing organizations to release non-interoperable systems. As a result, the ability to provide seamless telecommunication services in such a heterogeneous environment may be important to the success of the next generation of mobile communication systems.

Mobile IP is a current standard for supporting mobility in IP networks. Mobile IP defines a home agent and a foreign agent. The packets destined for a mobile host are intercepted by the home agent and tunneled to the foreign agent. The foreign agent de-capsulates the packets and forwards them directly to the mobile host. Mobile IP may provide a framework for allowing users to roam outside the home networks without disruption to their applications. However, known Mobile IP protocol networks are built with the wired Internet in mind where the end host's mobility is limited and infrequent. Furthermore, the Mobile IP protocol does not utilize network topology information and produces global updates whenever local mobility occurs, e.g., mobility between adjacent base stations in the same administration domain. Likewise, Mobile IP has no support for quality of service (QOS) features, such as high bandwidth requirements, high reliability requirements, and the like.

Mobile IP does not support QOS because it treats different forms of mobility uniformly, and produces a new care-of-address for every handover from one base station to another. Therefore, a user moving a short distance, e.g., between two adjacent base stations in the same administration domain, can experience significant disruption, e.g., loss and/or delay of signal, due to the frequent registration to the remote home agent. Likewise, creating a new care-of-addresses for every handover introduces complexity and delay for a new QOS reservation or path setup.

Known solutions include Cellular IP, Hawaii and other micro-mobility related protocols. Such protocols attempt to limit the global updates because of local movement by either introducing hierarchical foreign agents or smart foreign agents depending on the network topology. But the known schemes are based on homogeneous networks and the same administration domains. In other words, the known schemes attempt to solve the horizontal handover problems but do not address vertical handover, e.g., handovers between base stations under different administration domains. When vertical handover occurs, known schemes no longer work because no common agent exists above two separate administration domains. When vertical handover occurs, the mobile agent needs to rely on the Mobile IP to resolve macro-mobility issues. To enable seamless service, QOS capabilities should be provided during vertical handover.

RSVP is the current standard for supporting Inte-Serv in an IP network. It is known that to provide guaranteed service, reservation or admission control is needed at the edge router regardless of the QOS mechanism used in the core network. RSVP or its extension is a popular signaling protocol used by a host to request specific QOS capabilities from the network for particular application data streams. RSVP is also used by routers to deliver QOS requests to all nodes along the path of the data streams and to establish and maintain a state to provide the requested services.

A second set of protocols includes MRSVP, RSVP-A and other modifications to the RSVP signaling protocol. Because the RSVP protocol is designed without the consideration of mobility by its receiver-initiating algorithm, MRSVP and its relatives are proposed to support mobility. These protocols are based on proactively set up reservations, however, in base stations where the application is likely to travel. Such proactive reservation could lead to bandwidth waste due to the large amounts of control messages needed to refresh the RSVP soft states.

Micro-mobility protocols only deal with mobility issues and have no intrinsic QOS support. This problem can be addressed to some extent by using a common agent and reusing the common network path before and after handover. The previous reserved path could be reused and QOS reservation and update information could be limited to local network. But the lack of QOS support during the handover period still exists. When the terminal moves from one base station to other base stations, packets in the previous base station are either dropped or forwarded to the new base station without QOS support. Micro-mobility protocols attempt to decrease packet loss but other QOS parameters such as bandwidth and delay are not considered. Likewise, no differentiation exists between the treatments of different applications. Different applications have different QOS parameters in terms of bandwidth, delay and loss so they are divided into QOS classes and receive differentiated service based on their classes. But known handover schemes treat applications the same which violates the philosophy of differentiation and may lead to unnecessary system overuse.

As discussed above, when vertical handover occurs, micro-mobility and its related QOS improving extensions could not be used because of the lack of common agent and common network path. Schemes such as RSVP, MRSVP and RSVP-A which produce global updates and introduce longer handover periods can be used. A problem occurs regarding how to provide QOS support during this handover period.

Moreover, the upper-layer adaptation ability could also be taken into account when adopting network layer QOS support. Since adaptation ability is a basic requirement for elements working in the mobile domain, the application, middleware, and transport layer are equipped with some degree of adaptation mechanisms to deal with the packet loss or delay. Without the consideration of the upper-layer's adaptation ability, IP layer handover adaptation may unnecessarily duplicate the mechanism or even deteriorate the upper-layer's performance.

To enable seamless communications, there is a need for a QOS support system to support vertical handovers caused by mobile terminals.

BRIEF SUMMARY

A system and method are disclosed to support vertical handover between heterogeneous networks. To accommodate handover, an access router contacts a gateway specializing in supporting QOS during the handover. Paths with different QOS properties are configured among peer handover gateways. Thereafter, the gateway determines the corresponding destination handover gateway and chooses the path most suitable for the current handover requirements of applications. If no such path is available or the path is congested because of too much handover traffic, the handover is handled in an alternate way, such as in a best-effort fashion.

The handover gateways and related configured handover paths can be organized in different ways. One way is that each operator maintains their own gateway and sets up handover contracts with adjacent operators. As the number of operators increase, the scheme may become harder to manage. In another way, a hyper operator builds a specialized handover network and utilizes bi-lateral contracts with main operators to employ specialized gateways and handover paths. When handover occurs, the gateway in each domain contacts the hyper operator's overlay network to accomplish the handover process.

DETAILED DESCRIPTION

A quality of service (QOS) support system and method are described that address horizontal and vertical handovers, and particularly addresses vertical handover among different administrative domains, e.g., operators. Horizontal handovers include handovers between base stations that are using the same type of wireless network interface. Vertical handovers can include handovers between base stations under different administration domains. Other vertical handovers can be addressed such as handovers between different wireless network technologies, handovers between heterogeneous terminals, and handovers between heterogeneous applications for the same task. A business model of hyper operator can construct a specific handover network together with related AAA mechanisms. The hyper operator can obtain contracts with related operators and perform the handover for the related operators.

Figure 1:
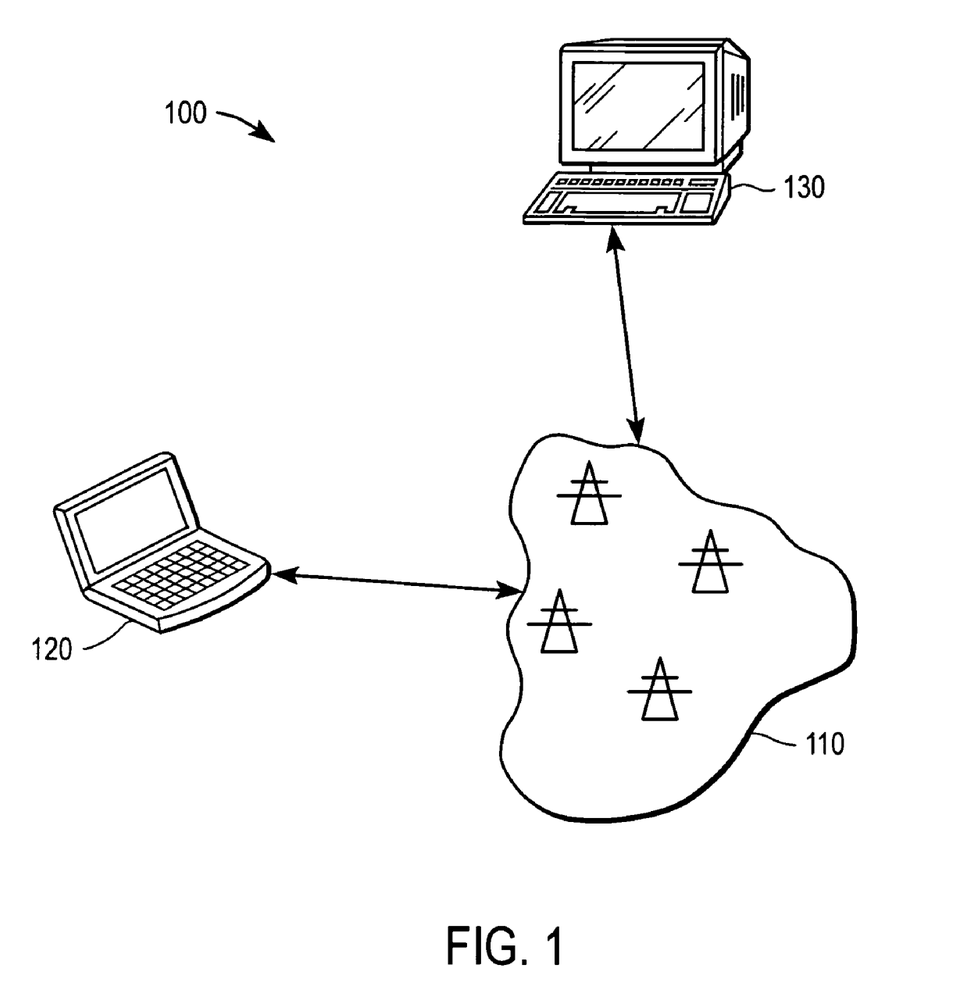
FIG. 1 is a block diagram illustrating an exemplary communications system for implementing the quality of service support system.

FIG. 1 is a block diagram of an exemplary communications system 100 for implementing the QOS support system. The communication system 100 includes a communication network 110. The communications network 110 can include networks such as a cellular network, satellite networks, local area networks (LAN) and Bluetooth networks. The communications system 100 may also include a mobile host 120 and an end device 130. The mobile host 120 may allow a user to access the end device 130. Typical mobile hosts 120 include a laptop computer, a mobile phone, such as a cellular phone, a personal digital assistant (PDA) or other mobile devices used to interface with end device 130 via the communications network 110. Typical end devices 130 include a desktop computer, a laptop computer, telephones, such as cellular phones, a PDA or other devices.

Figure 2:
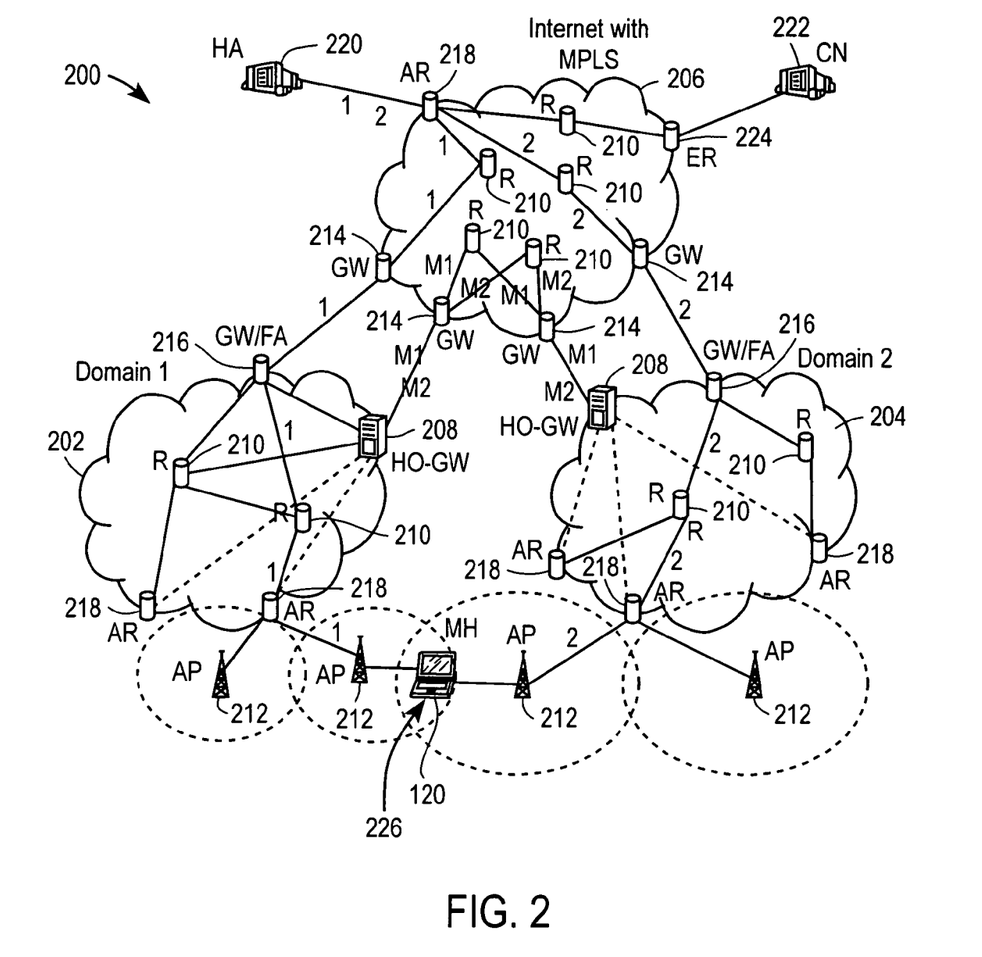
FIG. 2 is a block diagram illustrating a network architecture supporting QOS handover in which operators have contract with adjacent operators and no intermediate hyper operator is present.

FIG. 2 is a block diagram illustrating a network architecture that supports QOS handover where network operators have contract with adjacent operators and no intermediate hyper operator is present. The QOS support system 200 includes various administration domains, such as Domain one 202, Domain two 204 and a third domain, such as the Internet 206. The Internet 206 includes MPLS paths which are pre-configured by related administration domains after neighborhood information is collected. Administration domains 202, 204 and 206 contain information regarding the neighboring administration domains so that defined MPLS paths can be used. The QOS support system 200 allows a user of the mobile host 120 to communicate with the end device such as corresponding node (CN) 222.

The QOS support system 200 interacts with administration domains and provides necessary monitoring, signaling and maintenance functions to help guarantee QOS support during a vertical handover and new path reservation period. Regarding FIG. 4, described below, the QOS support system in FIG. 2 includes a distributed architecture without a hyper operator overlay network.

Referring to FIG. 2, a handover gateway (HO-GW) 208 is introduced in the administration domains 202, 204 to administer traffic during the vertical handover. A Multiprotocol Label Switching (MPLS) protocol, or the like, is used to arrange defined QOS paths between the administration domains 202, 204. Different MPLS paths having different QOS properties may be used to allow for the various treatment of handover traffic based on the application requirements.

Domain one 202, Domain two 204 and the Internet domain 206 also include other telecommunications components such as routers (R) 210 and antennas or access points (AP) 212. The Internet 206 routers include gateway (GW) routers 214 that connect to the foreign agent (FA) gateway (GW) routers 216 of Domain one 202 and Domain two 204. The routers also include access routers (AR) 218 that can be accessed by antennas or access points (AP) 212 and that can be accessed by other components such as home agent 220. The corresponding node (CN) 222, e.g., the communication peer of mobile host, can access the Internet domain 206 via other routers, such as an edge router (ER) 224.

Differentiated services (Diff-serv), a known QOS technology, MPLS and RSVP protocols, or other similar applications, can setup paths between the routers. Because of the scalability and traffic engineering ability, MPLS techniques can be used in the Internet 206 to set up the handover path with different QOS properties. Other techniques could also be used. By way of example, two MPLS paths M1 and M2 can be established between Domain one 202 and Domain two 204. Depending on the applications' requirements, either M1 or M2 could be used. The MPLS supports traffic engineering and tunneling and allows for communication frameworks which are scalable and suitable to implement in the core network. Traffic engineering is used to distribute the traffic to different paths according to current network traffic load. Tunneling is used to overlay the packets to a new destination by wrapping the packet in another packet.

Vertical handovers usually occur in an area where two networks have common coverage, known as an overlay area 226. Vertical handovers can occur when users actively choose an access network based on the user's own needs and can also occur in accordance with contracts with the service providers. The user's needs may include application QOS requirements, such as cellular networks for telephony and wireless local area networks (WLAN) for multimedia streaming. Other needs may include cost, security, and the like. Heterogeneous networks exist to accommodate the different needs of the user.

Vertical handover also may occur due to the limitations on access network coverage. Users change access systems when at the edge of a coverage area of an access network. When the user is located in the overlay area 226, the user can switch to another access network using vertical handover. If the user is not located in the overlay area 226, the user could lose the connection. When disconnection occurs, the session is either reset or software may attempt to compensate in other ways, such as using different coding schemes to recover the losses from packets already received.

The Internet protocol (IP) is a common network layer to connect different administration domains and the Internet 206. The Internet 206 includes some QOS support such as MPLS. Macro-mobility which may not be handled by described framework due to a lack of handover paths between operators, may be handled by standard Mobile-IP protocols. The administration domains include versions of the micro-mobility algorithm such as HAWAII, Cellular IP, and the like, to help guarantee the QOS during horizontal handover and MPLS paths within the network.

The corresponding node (CN) 222 uses a mobile-IP communication protocol to communicate with the mobile host (MH) 120. The home agent (HA) 220 includes functions, such as via software, to support a multiple path reservation. The reservation is accomplished by the home agent (HA) 220 via the RSVP protocol. The Mobile IP protocol is used to route the packets, but without QoS support, and protocols such as RSVP, Diff-Serv or MPLS are used to set up the QoS support. Domain one 202 and Domain two 204 include handover gateways (HO-GW) to accommodate the vertical handover QOS. QOS between the handover gateways (HO-GW) and access routers are accomplished by domain-specific QOS mechanisms. Access point (AP) 212 includes layer 2 QOS mechanisms also according to different underlying layer 2 technologies such as 802.1 Q/D and Subnet Bandwidth Manager (SBM) for the LAN.

MPLS paths M1 and M2 with defined QOS properties accommodate end-to-end QOS handling during vertical handover. The handover gateways (HO-GW) 208 for Domain one 202 and Domain 2 204 establish the MPLS paths M1 and M2. For the administration domains, handover gateways (HO-GW) 208 can be organized in a hierarchical manner where multiple hand-over gateways HO-GW in the administration layers of one domain can be involved in setting up the handover path depending on the network topology and handover traffic patterns. The handover gateways (HO-GW) 208 are responsible for handover traffics of the multiple access routers (AR) 218. For access routers (AR) 218 near the overlay area with networks of another administration domain, more vertical handovers can occur via the handover gateway (HO-GW) 208. Without a centralized operator such as Hyper Operator described later, the handover gateways (HO-GW) 208 in each administration domain identifies adjacent handover gateways of other operators. By logging the mobility pattern of its client over a period of time and examining the client's next operator after handover, the adjacent handover gateway information can be derived. Once the adjacent handover gateways are identified, MPLS paths can be established.

Figure 3:
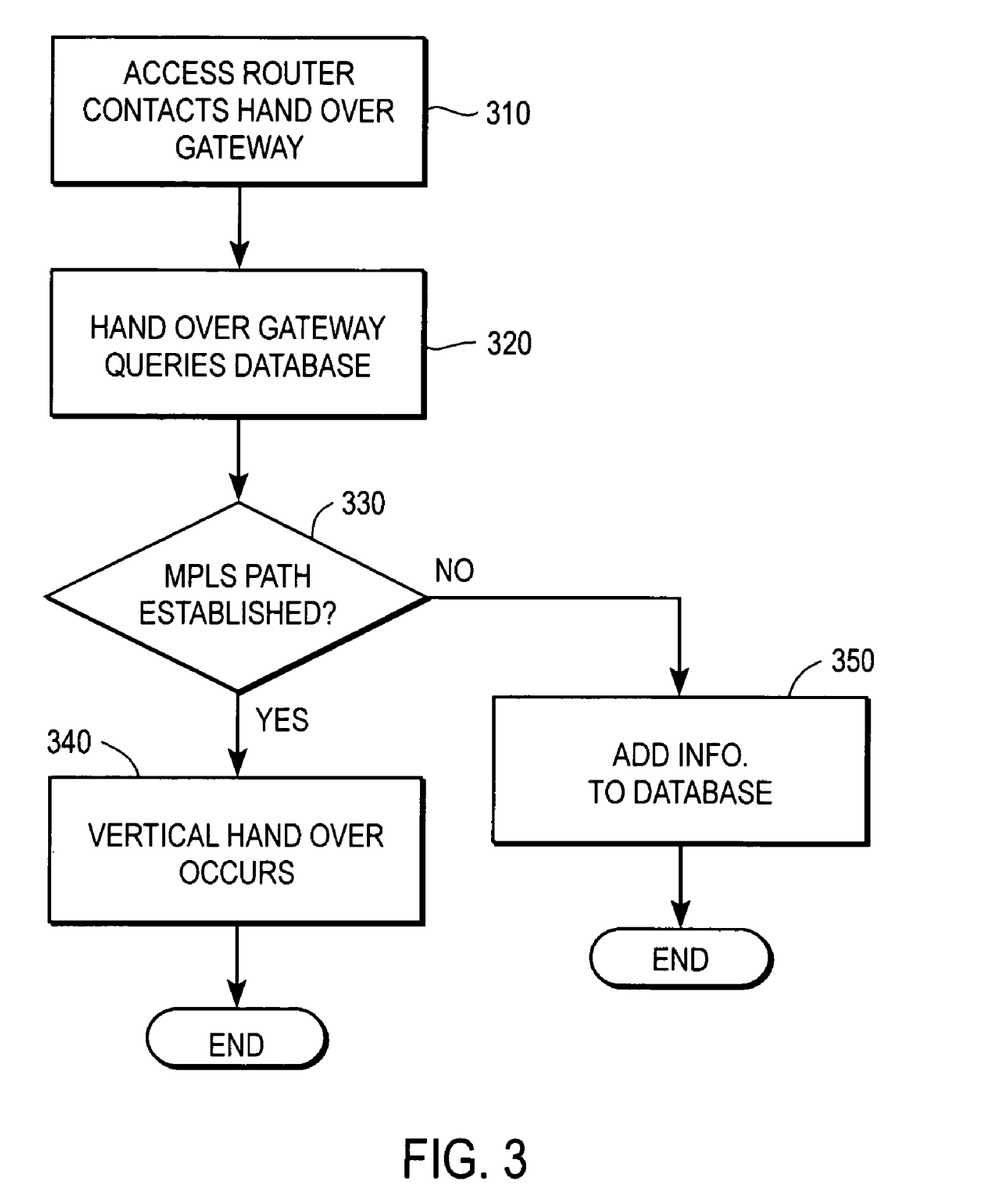
FIG. 3 is a flow chart describing a handover process.

FIG. 3 is a flow chart describing a handover process. At block 300, an information gathering process begins such that whenever a vertical handover occurs, the access router (AR) 218 informs a supervising handover gateway (HO-GW) 208 of the destination administration domain, e.g., Domain one 202 or Domain two 204. A link layer mobility management algorithm could supply the access router with the destination administration domain information. At block 310, upon receiving the information, the handover-gateway (HO-GW) 208 queries a neighborhood database to determine whether the database includes the administration domain and MPLS paths have been established. At block 340, if the administration domain is included and the MPLS has been established, the vertical handover can occur. At block 350, otherwise, the information is added to the database according to an updating algorithm so that the initialization process of the new MPLS paths for the next vertical handover could be served. Because each access router can only overlay a limited number of networks, only several rounds may be needed for the handover-gateway (HO-GW) 208 to complete the learning to have full functionalities.

Thus, the handover gateways (HO-GW) 208 can learn and update neighborhood databases and establish MPLS paths (M1 and M2 are used only as an example, multiple paths could be established based on the requirements) having different QOS parameters to each neighboring network. The handover gateway (HO-GW) 208 can also communicate with other handover gateways (HO-GW) in the same administration domain to accommodate performance and scalability. The handover gateway (HO-GW) 208 monitors and maintains the MPLS paths and reports related QOS parameters to the access routers (AR) 218 to achieve new admission control algorithms. The handover gateways (HO-GW) 208 can also handle signaling and tunneling tasks to begin and end handover traffics.

Standard MPLS procedure can be used to setup the routers, for example, to choose the correct QOS classes, application QOS requirement, such as real-time or not real time, and differentiated handover QOS requirements. The handover QOS requirements may be influenced by the application QOS requirements. According to Internet protocol 2 (IP2), handover is classified as fast handovers, smooth handovers and seamless handovers. Other types of handovers include a high-bandwidth handover. A fast handover is a handover that can satisfy strict delay bounds, for example, real-time services. A smooth handover is a handover that can minimize a loss of packets. And seamless handover is a handover with minimum perceptible interruption of the services.

MPLS allows for a fine granularity in terms of QOS parameters, thus multiple paths can be established to obtain finer control of handover qualities and obtain a good balance between performance, price and complexities. Some of the QOS parameters influencing applications include delay, loss and bandwidth, which can be accommodated by combinations of the fast handover, smooth handover, high-bandwidth handover and seamless handover.

To support vertical handover, the access router (AR) 218 determines what kind of service the application of the mobile host (MH) 120 requires during the handover. The determination can be achieved in different ways. For example, the application could inform the access router (AR) 218 of the information at application initialization based on the application requirements and its adaptation ability above the IP layer, for example, adaptation ability in the transport layer, application layer, or any other layer above IP layer. In addition, the access router (AR) 218 can derive the information by examining flow port fields. In an IP packet header, the port field is used to show what upper layer protocol is used in this packet, i.e., application category information. Examination of the flow port fields allows for application transparency, but can achieve less accurate information than if the information were determined from the application.

After the paths are set and the access router receives a vertical handover service requirement, the paths can be used in several ways. The paths can be used to forward residue packets from a current access point (AP) 212, for example one that is located in Domain one 202, to a new access point (AP) 212, for example one that is located in Domain two 204, after handover occurs. The paths can also be used to forward new packets from the current access point (AP) 212 to the new access point (AP) 212 during the period of a new reservation between the corresponding node (CN) 222 and the new access point (AP) 212. If a new reservation cannot be achieved quickly, the path can be used to forward the packets until a new reservation is achieved or the session is terminated.

Figure 4:
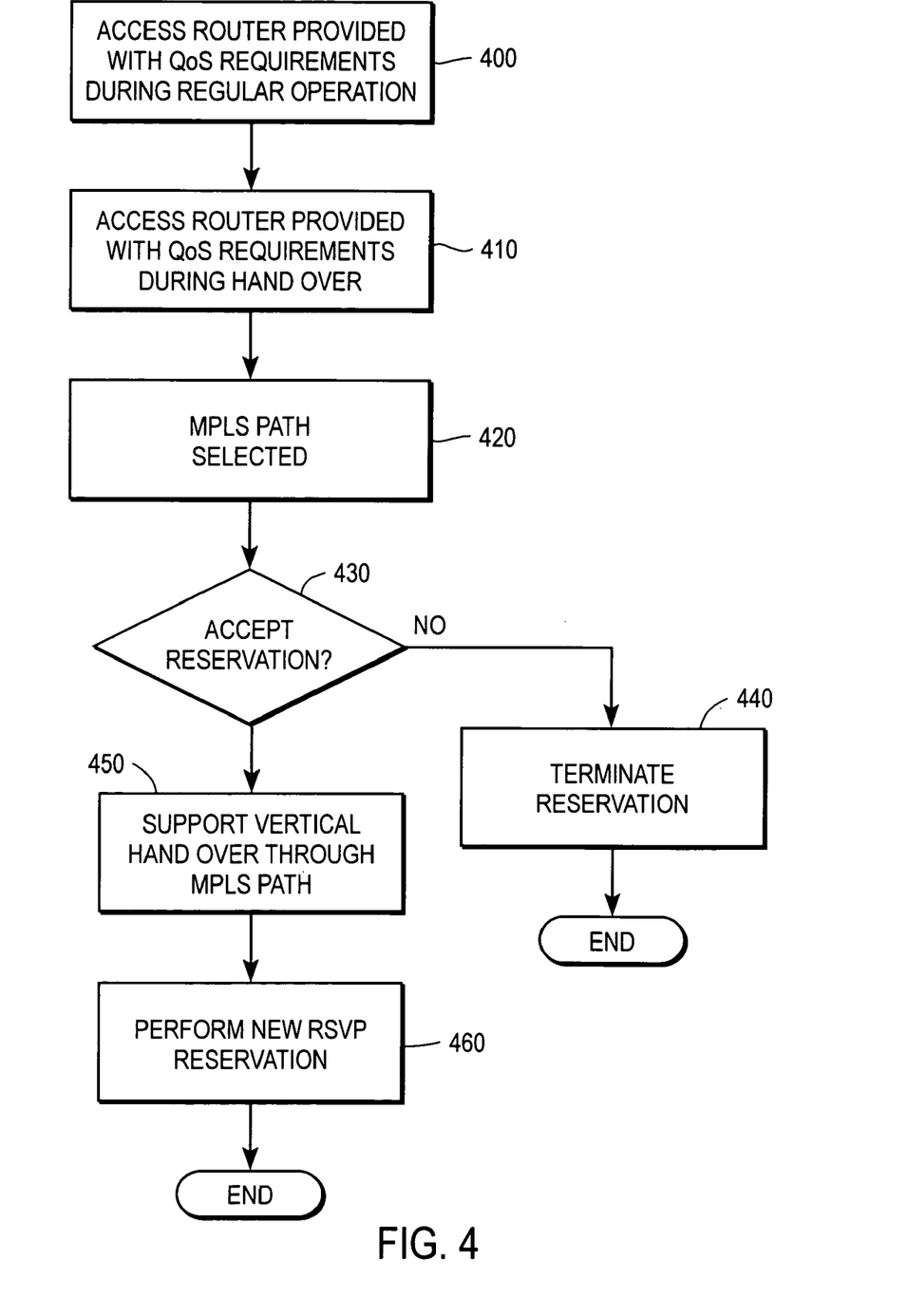
FIG. 4 is a flowchart illustrating exemplary reservation, admission control and choice of handover path according to the quality of service requirements of the application.

FIG. 4 is a flowchart illustrating exemplary reservation and admission control according to the QOS support system. The mobile host (MH) 120 can include an application that accomplishes the reservation and admission control. The reservation path could occur via the links between mobile (MH) 120 and the home agent (HA) 220 and the links between home agent (HA) 220 and corresponding node (CN) 222. By examining how the QOS is supported before and after a vertical handover, the application runs in different phases.

A first phase includes the time before the handover in which the application typically operates. QOS support in this phase is achieved through maintained RSVP paths established by traditional RSVP protocols. A second phase includes the period from the time when handover is detected in original base station to the time when the new RSVP path is established to the new base station. During this time period, the RSVP path of the first phase and the selected configured MPLS path operate together to guarantee QOS support to the application. A third phase includes the period when the reservation path of the first phase and the MPLS handover path are released, and only the newly established path is used for the traffic that follows. After the third phase, the application can enter the first phase and begins regular operation again.

At block 400, RSVP messages are used to provide the access router (AR), also the admission control point, 218 with the application's QOS requirements during the non-handover operation phase. The RSVP messages including information such as desired QOS (RSPEC), traffic characteristics (TSPEC) and flow differentiation (FILTER_SPEC). At block 410, the access router (AR) 218 is provided with application's QOS requirements of the second phase, e.g. the requirements during the handover. Because mobile computing software can vary, to help guarantee service, a service loss profile, vertical handover service requirements, and probability of seamless communication factors can include the factors used to express the adaptive QOS requirements during the translation.

At block 420, a configured MPLS path is selected in accordance with the specified handover QOS requirements. The access routers (AR) 218 can be used to determine particular MPLS paths such as M1 or M2 suitable for the application using the information factors described above. Current traffic loads on the MPLS paths M1 and M2 can also be considered. Monitoring and reporting functions of the handover gateway (HO-GW) 208 can report the traffic load.

At block 430, admission control is used to determine whether to accept the application's reservation or not. The received handover requirements are used to help determine whether or not to accept the reservation. For example, an admission control algorithm could be used that includes the delay on the selected MPLS path in the calculation of end-to-end delay bounds regardless of whether the path is used for a vertical handover. Other, less conservative, algorithms could be used, such as algorithms based on stochastic models to produce more accurate system usage information. At block 440, if the reservation is not accepted, the reservation is terminated and resubmitted later as needed.

At block 450, if the reservation is accepted, when vertical handover occurs between the mobile host (MH) 120 and the corresponding node (CN) 222, the vertical handover is supported through the configured MPLS paths. The new RSVP reservation is carried on from corresponding node (CN) 222 to the mobile host (MH) through the new paths to the new network. During the process time (the handover time), the QOS support is guaranteed until a new reservation is completed.

The QOS support system uses the above-described path setup process and advanced admission control process to achieve QOS support during vertical handover. The mobile host (MH) 120 is located in an overlay area 226 of Domain 1 and domain 2. A QOS support system algorithm is initiated by a domain, e.g., Domain 1. The application sends the required QOS parameter to the access router in domain 1. The access router contacts its supervised handover-gateway (HO-GW) to determine which MPLS path can accommodate the application. After admission control succeeds, path 1 is set up between the mobile host and the corresponding node (CN) 222. The reservation process runs on top of the Mobile IP, e.g., an IP-IP tunneling QOS support is used.

When the mobile host (MH) 120 switches to Domain 2, vertical handover occurs. After the mobile host (MH) 120 passes the authentication and authorization procedures in Domain 2, the Domain 2 access router informs the handover gateway (HO-GW) 208 located in Domain 2, which in turn contacts the handover gateway (HO-GW) 208 located in domain 1 to establish a tunnel between the access routers located in Domain 1 and Domain 2. The tunnel uses the selected MPLS paths so that the end-to-end QOS requirements are followed. The access router (AR) 218 located in Domain 2 renegotiates the path between the mobile host (MH) 120 and the corresponding node (CN) 222. During setup, new packets continue to be sent to the Domain 1 access router and then tunneled to the Domain 2 access router (AR) 218.

When the setup of the new path is complete, if the admission control succeeded, a router, e.g., the last router accomplishing the admission control can send a confirmation message, such as a RESVconf message, to the Domain 2 router to reserve the path. The router can also send a message to the Domain 1 router to disconnect the old path, e.g., such as a RESVtear message. Upon receiving the RESVtear message, the Domain 1 access router completes the packets in the access router's buffer and informs the Domain 1 handover gateway (HO-GW).

If the admission control fails, the RESVtear information is returned to the Domain 2 access router. The Domain 2 access router can then handle the call in accordance with a defined policy or application requirements. Domain 2 can continue to use the tunnel between the new access router and attempt to renegotiate the reservation, e.g., after a time delay, to try to gain admission control. The Domain 2 access router can negotiate with the Domain 1 access router (AR) 218 about how long the tunnel is maintained. The Domain 2 access router (AR) 218 can also negotiate with the mobile host about how the adaptation can occur. Because the connection is maintained, QOS support is used during this process too.

Figure 5:
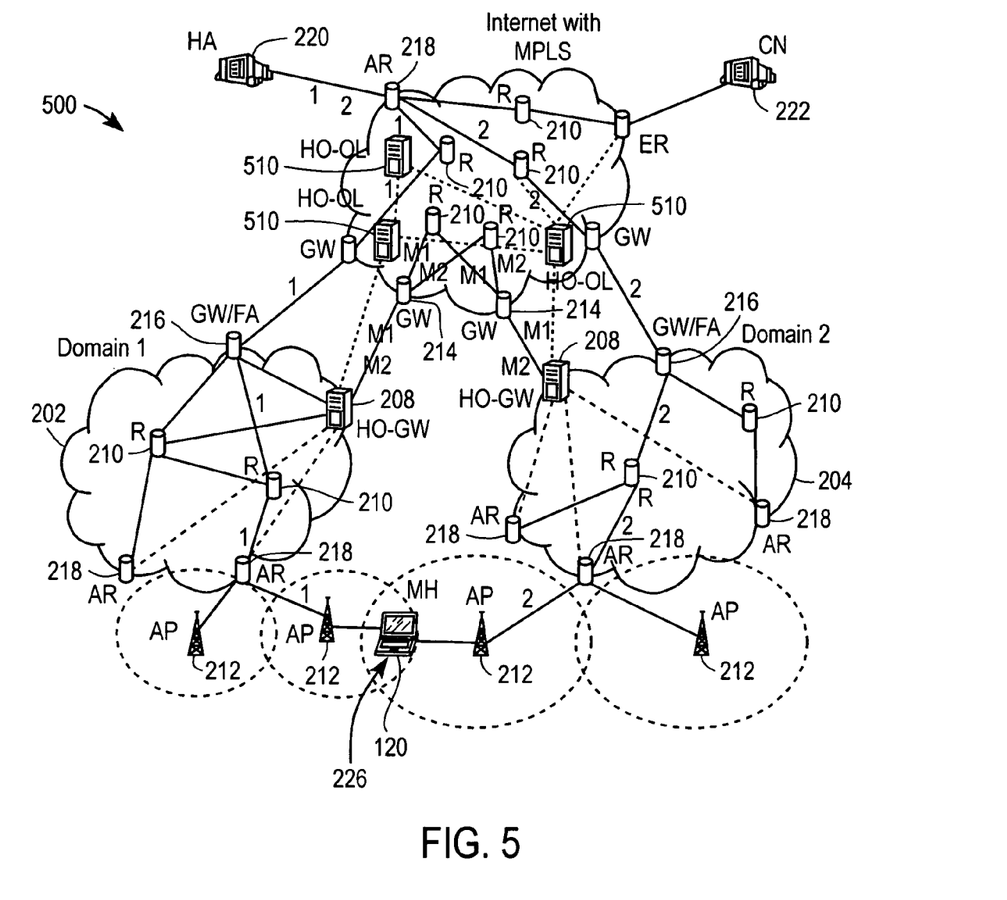
FIG. 5 is a block diagram illustrating a network architecture according to the quality of service support system including a hyper operator overlay network.

FIG. 5 is a block diagram illustrating a network architecture according the QOS support system 500, where the architecture includes a hyper operator overlay network (HO-OL) 510. The hyper operator overlay network (HO-OL) can exist in the Internet domain 206 which interacts with the related gateways in the administration domains, e.g., Domain one 202 and Domain two 204. The hyper operator overlay network (HO-OL) 510 can reduce the number of tasks performed by the handover gateway (HO-GW) 208 in the administration domains. The hyper operator overlay network (HO-OL) 510 can control several functions, such as, establishing the MPLS paths, monitoring and maintaining the traffic in the MPLS paths M1 and M2, and cooperating with the access router (AR) 218 to perform the admission control. The handover gateway (HO-GW) 208 would then administer local optimization, such as by providing QOS support in the administration domain.

Because the hyper operator overlay network (HO-OL) 510 has global knowledge of each administration domain, optimal vertical handover performance could be achieved. The hyper operator overlay network (HO-OL) 510 can interact with related routers located in the core network to support QOS routing and accelerate the reservation process of the new path. The hyper operator overlay network (HO-OL) 510 can also address other related policy issues such as security and AAA (authentication, authorization, accounting), and the like, which are generally not easy for one operator. The hyper operator overlay network (HO-OL) 510 can also provide a signaling path so that the architecture is easy to implement.

Thus, QOS support systems are shown using a hyper operator overly (HO-OL) architecture or a distributed architecture. The architectures include vertical handover gateways (HO-GW) 208 to support seamless vertical handovers. The frameworks can support varying handover requirements in terms of delay, loss and bandwidth by choosing an MPLS path. The frameworks can also account for the adaptation ability of the application layer by allowing the application to specify the QOS requirements after considering the applications mechanisms. The network can then provide necessary adaptation ability and avoid duplicate functionalities. The frameworks support different applications.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

We claim:

1. A method comprising:
   establishing paths for potential use during a vertical handover between different administration domains;
   monitoring and maintaining traffic in a plurality of paths; and
   cooperating with an access router to perform admission control and to achieve quality of service (QOS) support during a vertical handover.

2. An apparatus comprising:
   means for establishing paths for potential use during a vertical handover between different administration domains;
   means for monitoring and maintaining traffic in a plurality of paths; and
   means for cooperating with an access router to perform admission control and to achieve quality of service (QOS) support during a vertical handover.

3. A method for supporting handover between heterogeneous networks, comprising:
   establishing paths for potential use during a vertical handover between different administration domains;
   performing admission control that considers quality of service (QoS) properties of established handover paths and a reservation path;
   determining a handover path to use, based at least in part on QoS considerations, during a vertical handover between base stations of different administration domains; and
   using the determined handover path to support the vertical handover.

4. A method comprising:
   maintaining a handover network for use, at least in part, in performing vertical handovers; and
   using a gateway selected from a plurality of gateways, based on quality of service (QOS) considerations, to route and forward communication traffic from a first network operator to a second network operator during a vertical handover via the handover network, wherein at least one of the first and second network operators is a wireless network operator.

5. An architecture comprising:
   a hyper operator network to establish paths for vertical handover communication traffic and to maintain and monitor traffic in the paths;
   a gateway coupled to hyper operator network, wherein the hyper operator overlay network cooperates with the gateway to route and forward communication traffic from a first network operator to a second network operator during a vertical handover via the handover network, wherein at least one of the first and second network operators is a wireless network operator.

* * * * *

UNITED STATES PATENT AND TRADEMARK OFFICE
CERTIFICATE OF CORRECTION

| | | |
|---|---|---|
| PATENT NO. | : 7,613,457 B2 | Page 1 of 1 |
| APPLICATION NO. | : 11/418858 | |
| DATED | : November 3, 2009 | |
| INVENTOR(S) | : Gao et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 599 days.

Signed and Sealed this

Nineteenth Day of October, 2010

David J. Kappos
*Director of the United States Patent and Trademark Office*